United States Patent
Kerns et al.

(10) Patent No.: US 6,479,601 B1
(45) Date of Patent: Nov. 12, 2002

(54) TRANSITION METAL CATALYSTS FOR DIENE POLYMERIZATIONS

(75) Inventors: Michael Lester Kerns, Elyria, OH (US); Daniel Edward Bowen, III, Munroe Falls, OH (US); Stephan Rodewald, Canal Fulton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 7 days.

(21) Appl. No.: 09/604,363

(22) Filed: Jun. 27, 2000

Related U.S. Application Data

(60) Provisional application No. 60/147,694, filed on Aug. 6, 1999.

(51) Int. Cl.[7] .................................................. C08F 4/42
(52) U.S. Cl. ...................... 526/161; 526/171; 526/172; 526/120; 526/141; 526/335; 526/348; 502/155; 502/162; 502/167
(58) Field of Search .................................. 526/161, 171, 526/172, 120, 141, 335, 348; 502/155, 162, 167

(56) References Cited

U.S. PATENT DOCUMENTS

| | | | |
|---|---|---|---|
| 4,048,418 A | 9/1977 | Throckmorton | 526/138 |
| 4,663,405 A | 5/1987 | Throckmorton | 526/144 |
| 5,100,982 A | 3/1992 | Castner | 526/143 |
| 5,698,643 A | 12/1997 | Donbar et al. | 526/142 |
| 5,753,579 A | 5/1998 | Jalics et al. | 502/153 |
| 5,811,499 A | 9/1998 | Castner | 526/143 |
| 5,834,573 A | 11/1998 | Castner | 526/142 |
| 5,866,663 A | 2/1999 | Brookhart et al. | 526/170 |
| 5,906,956 A | 5/1999 | Halasa et al. | 502/154 |
| 6,184,171 B1 * | 2/2001 | Shih | 502/158 |

FOREIGN PATENT DOCUMENTS

| | | | |
|---|---|---|---|
| EP | 0 889 061 | * | 1/1999 |
| WO | WO 98/27124 | * | 6/1998 |
| WO | WO 98/30612 | * | 7/1998 |

* cited by examiner

*Primary Examiner*—David W. Wu
*Assistant Examiner*—Ling-Siu Choi
(74) *Attorney, Agent, or Firm*—Alvin T. Rockhill

(57) ABSTRACT

This invention is based upon the unexpected discovery that certain catalyst systems which are comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of certain azopyridines and certain iminopyridines; and (C) methylalumoxane can be used to catalyze the polymerization of diene monomers, such as 1,3-butadiene and isoprene, into polymers, such as high cis-1,4-polybutadiene rubber. Some representative examples of azopyridines that can be utilized in the catalyst systems of this invention include 2-phenylazopyridine, 4-methyl-2-phenylazopyridine, and 2,6-diphenylazopyridine. The subject invention more specifically discloses a process for synthesizing a polybutadiene rubber which comprises polymerizing 1,3-butadiene at a temperature which is within the range of about 10° C. to about 100° C. in the presence of a catalyst system which is comprised of (A) a transition metal compound selected from the group consisting of iron (II) compounds, iron (III) compounds, cobalt (II) compounds, cobalt (III) compounds, and nickel (II) compounds; (B) an azopyridine ligand selected from the group consisting of 2-phenylazopyridine, 4-methyl-2-phenylazopyridine, and 2,6-diphenylazopyridine; and (C) methylalumoxane.

18 Claims, No Drawings

TRANSITION METAL CATALYSTS FOR DIENE POLYMERIZATIONS

This application claims the benefit of application Ser. No. 60/147,694 filed Aug. 6, 1999.

BACKGROUND OF THE INVENTION

A wide variety of catalyst systems can be used in the polymerization of diene monomers, such as 1,3-butadiene or isoprene, into polymers. For instance, anionic polymerization techniques that utilize alkyl lithium initiators can be used to polymerize 1,3-butadiene into polybutadiene rubber or to polymerize isoprene into polyisoprene rubber. Copolymers of diene monomers and vinyl aromatic monomers, such as styrene, can also be made by anionic polymerization techniques. For instance, anionic polymerization techniques can be used to copolymerize 1,3-butadiene and styrene to make styrene-butadiene rubber (SBR).

U.S. Pat. No. 5,906,956 discloses an initiator system which is comprised of (a) a lithium initiator, (b) a sodium alkoxide, and (c) a polar modifier. This anionic system can be used to polymerize 1,3-butadiene into polybutadiene having a high vinyl content or to polymerize isoprene into polyisoprene having a high 3,4-isomer content.

U.S. Pat. No. 5,753,579 discloses a process for synthesizing polymers having high trans-isomer contents with an initiator system which is comprised of (a) at least one organolithium or organomagnesium initiator, (b) an organoaluminum compound, (c) a barium compound, and (d) an organozinc compound.

U.S. Pat. No. 5,100,982 discloses a catalyst system which can be utilized in the polymerization of 1,3-butadiene monomer into trans-1,4-polybutadiene. This catalyst system is comprised of an organocobalt compound, an organoaluminum compound, a para-alkyl substituted phenol which contains from about 12 to about 26 carbon atoms, and carbon disulfide.

Lanthanide and actinide catalyst systems are considered to be "pseudo-living" because polymers synthesized with such rare earth systems increase in molecular weight with increasing conversions. Conjugated diolefin monomers can be polymerized into rubbery polymers using such catalyst systems. More specifically, 1,3-butadiene can be polymerized into high cis-1,4-polybutadiene with a catalyst system which is comprised of (i) an organoaluminum compound, (ii) an oganometallic compound which contains a lanthanide metal from Group III-B, such as neodymium, praseodymium, cerium, or gadolinium, and (iii) a labile halide ion. U.S. Pat. No. 4,663,405 discloses technique for controlling the molecular weight of polymers made with such lanthanide or actinide catalyst systems by conducting the polymerization in the presence of a vinyl halide.

U.S. Pat. No. 5,834,573 discloses a process for synthesizing trans-1,4-polybutadiene polybutadiene by polymerizing 1,3-butadiene monomer in the presence of a catalyst system which is comprised of cobalt (III) acetylacetonate, an organoaluminum compound, and a para-alkyl-substituted phenol, wherein the cobalt (III) acetylacetonate is mixed with a portion of the para-alkyl-substituted phenol prior to the polymerization and wherein the organoaluminum compound is mixed with the balance of the para-alkyl-substituted phenol prior to the polymerization.

U.S. Pat. No. 5,811,499 discloses a process for synthesizing cis-1,4-polybutadiene rubber which comprises polymerizing 1,3-butadiene in the presence of (a) an organocobalt compound, (b) a trialkylaluminum compound, and (c) hexafluoro-2-propanol.

High cis-1,4-polybutadiene rubber can be make with nickel catalyst systems which are comprised of (i) an organonickel compound, (ii) an organoaluminum compound, and (iii) a fluorine containing compound. U.S. Pat. No. 5,698,643 discloses such a nickel catalyst system where the molecular weight of the high cis-1,4-polybutadiene rubber produced is controlled by the addition of 1-butene, isobutylene, cis-2-butene, trans-2-butene, or allene.

U.S. Pat. No. 4,048,418 discloses a method of polymerizing conjugated diolefin monomers containing from 4 to about 12 carbon atoms into high molecular weight polymers by bringing the conjugated diolefin monomers into contact with a catalyst system consisting of (i) an iron-containing compound, (ii) an organometallic reducing agent from Group I or III of the Periodic Table, and (iii) a nitrogen-containing ligand.

U.S. Pat. No. 5,866,663 to Brookhart discloses a process for polymerizing olefins, such as ethylene, acyclic olefins, and/or selected cyclic olefins. The polymerizations of U.S. Pat. No. 5,866,663 are catalyzed by selected transition metal compounds, such as iron (II) compounds, and sometimes other co-catalysts.

SUMMARY OF THE INVENTION

This invention is based upon the unexpected discovery that certain catalyst systems which are comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of certain azopyridines and certain iminopyridines; and (C) methylalumoxane can be used to catalyze the polymerization of diene monomers, such as 1,3-butadiene and isoprene, into polymers, such as high cis-1,4-polybutadiene rubber. Some representative examples of azopyridines that can be utilized in the catalyst systems of this invention include 2-phenylazopyridine, 4-methyl-2-phenylazopyridine, and 2,6-diphenylazopyridine.

This invention more specifically discloses a catalyst system which is comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of (i) azopyridines of the structural formula:

(ii) azopyridines of the structural formula:

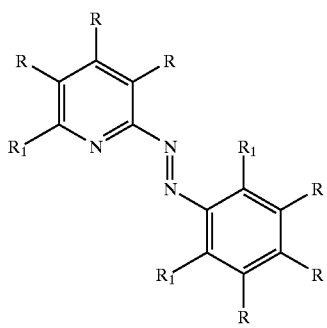

(iii) iminopyridines of the structural formula:

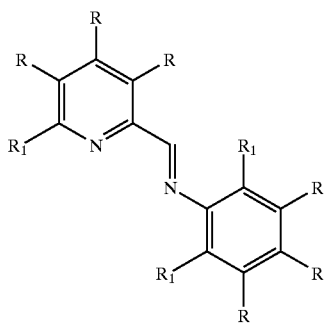

and (iv) iminopyridines of the structural formula:

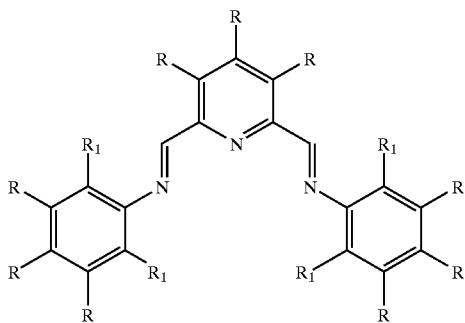

wherein R represents a hydrogen atoms, a hydrocarbyl groups, or a substituted hydrocarbyl groups, and wherein $R_1$ represents a hydrogen atom or a methyl group; and (C) methylalumoxane.

This invention also reveals a process for synthesizing a rubbery polymer which comprises polymerizing at least one diene monomer in the presence of a catalyst system which is comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of (i) azopyridines of the structural formula:

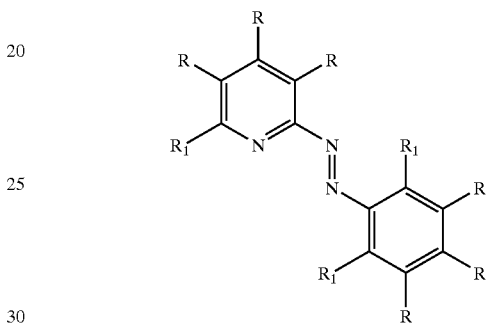

(ii) azopyridines of the structural formula:

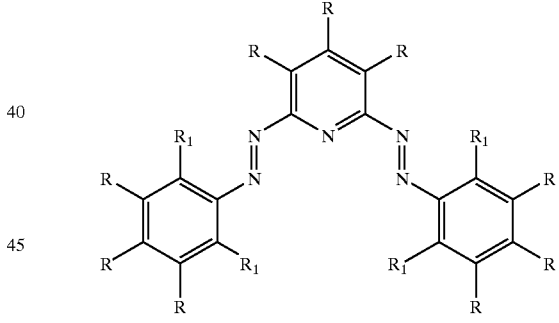

(iii) iminopyridines of the structural formula:

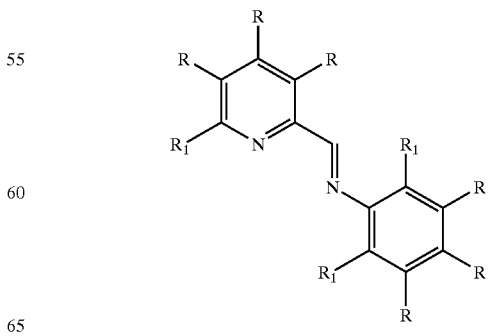

and (iv) iminopyridines of the structural formula:

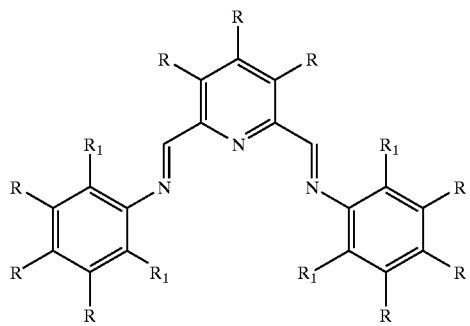

wherein R represents a hydrogen atom, a hydrocarbyl group, or a substituted hydrocarbyl group, and wherein $R_1$ represents a hydrogen atoms or a methyl groups; and (C) methylalumoxane.

The subject invention further discloses a process for synthesizing a polybutadiene rubber which comprises polymerizing 1,3-butadiene at a temperature which is within the range of about 10° C. to about 100° C. in the presence of a catalyst system which is comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of (i) azopyridines of the structural formula:

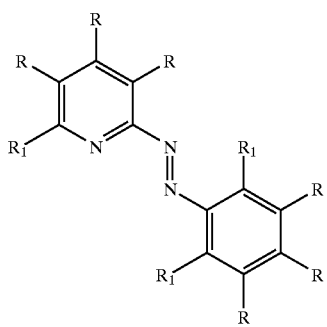

(ii) azopyridines of the structural formula:

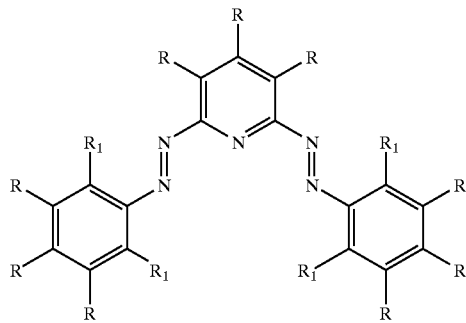

(iii) iminopyridines of the structural formula:

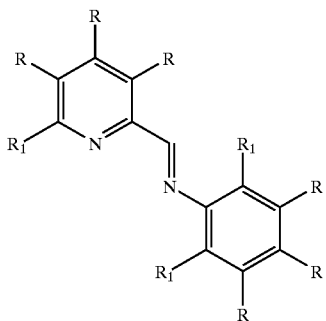

and (iv) iminopyridines of the structural formula:

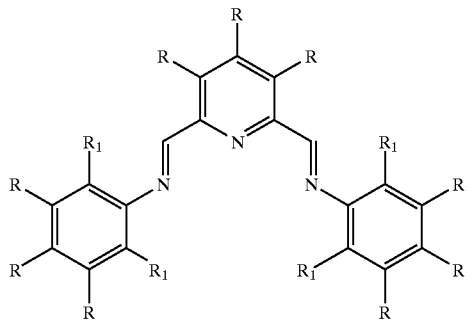

wherein R represents a hydrogen atom, a hydrocarbyl group, or a substituted hydrocarbyl and wherein $R_1$ represents a hydrogen atoms or a methyl groups; and (C) methylalumoxane.

The present invention further reveals a catalyst system which is comprised of (A) a transition metal compound selected from the group consisting of iron (II) compounds, iron (III) compounds, cobalt (II) compounds, cobalt (III) compounds, and nickel (II) compounds; (B) a ligand selected from the group consisting of (i) azopyridines of the structural formula:

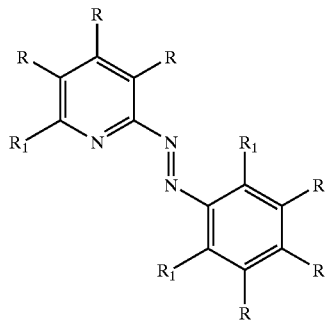

(ii) azopyridines of the structural formula:

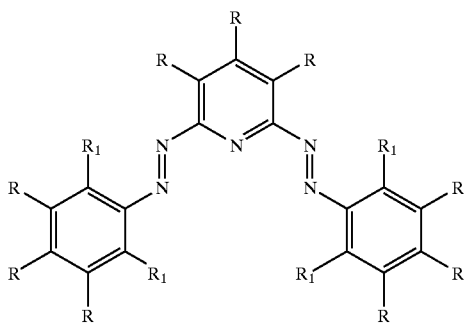

(iii) iminopyridines of the structural formula:

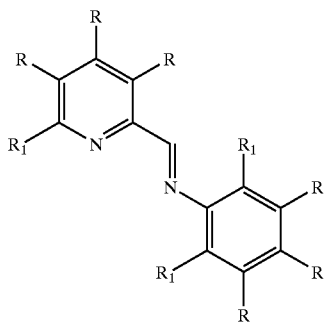

and (iv) iminopyridines of the structural formula:

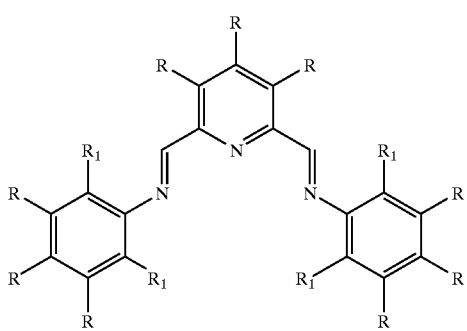

wherein R represents a hydrogen atom, a hydrocarbyl group, a substituted hydrocarbyl group, or a heteroatom containing hydrocarbyl group wherein the heteroatom is selected from the group consisting of boron, nitrogen, sulfur, phosphorus, oxygen, and silicon, and wherein $R_1$ represents a hydrogen atoms or a methyl groups; and (C) methylalumoxane.

DETAILED DESCRIPTION OF THE INVENTION

Virtually any iron (II) compound, iron (III) compound, cobalt (II) compound, cobalt (III) compound, or nickel (II) compound can be used as the transition metal component in the catalyst systems of this invention. For instance, the transition metal compound can be an iron (II) or an iron (III) compound selected from the group consisting of monoacetyl ferrocene, di(4-aminobutyl)-cyclopentadienyl iron, aminoferrocene, (benzoylcyclopentadienyl) cyclopentadienyl iron, phenylferrocenylmethane, cyclopentadienyl iron, ferrocene monocarboxylic acid, (carboxylamidecyclopentadienyl)cyclopentadienyl iron, di(3-carboxypropionyl)cyclopentadienyl iron, chloromercuriferrocene, (p-chlorophenylcyclo-pentadienyl) cyclopentadienyl iron, cyanocyclopentadienyl) cyclopentadienyl iron, di[(3-cyanopropionyl) cyclopentadienyl]iron, cycloheptatrienyliron dicarbonyl, (cyclopentenylcyclopentadienyl)cyclopentadienyl iron, (cyclopentylcyclopentadienyl)cyclopentadienyl iron, 1,1'-di (acetylcyclopentadienyl)iron, 1,1'-dibenzhydrylferrocene, 1,1'-dibenzoylferrocene, 1,1'-dibenzylferrocene, ferrocene dicarboxylic acid, ferrocene 1,3-dicarboxylic acid, 1,1'-di (chloromercuri)ferrocene, 1,1'-di(p-chlorophenylcyclopentadienyl)iron, ferrocenyl-bis-phenyl methanol, 1,1'-di(methylcarboxycyclo-pentadienyt)iron, (1,3-diphenylcyclo-pentadienyl)cyclopentadienyl iron, 1,1'-diphenyl-dicyclopentadienyl iron, 1,1'-di(trimethylsilyl) ferrocene, ferrocene, ferrocenyl-acetic acid, 1,1'-ferrocenyl-diacetic acid, α-ferrocenyl-ethyl alcohol, ac-ferrocenyl-propionic acid, formylcyclopentadienyl)cyclopentadienyl iron, phenyl-ferrocenyl methanol, hydroxymethylferrocene, p-hydroxyphenylcyclo-pentadienyl)cyclopentadienyl iron, (methylcarboxy-cyclopentadienyl)cyclopentadienyl iron, bis(methyl-isonitrile)tricarbonyl iron, (p-nitrophenylcyclopentadienyl)cyclopentadienyl iron, phenyl ferrocene, 1,3,1',3'-tetraphenylferrocene, thiopheniron dicarbonyl, trimethylsilyl ferrocene, ferric, oxalate, ferric hexanoate, ferric octanoate, ferric decanoate, ferric stearate, ferric naphthenate, ferrous acetylacetonate, ferric acetylacetonate, ferric-1-ethoxy-1,3-butanedionate, ferrous dimethyl glyoxime, ferric chloride, ferrous chloride, ferric bromide, ferric fluoride, ferric phosphate, ferrous sulfate, iron tetracarbonyl, iron pentacarbonyl, and iron nonacarbonyl.

The ligands used in the catalyst systems of this invention can be azopyridines or iminopyridines. The azopyridines that can be used can be of the structural formula:

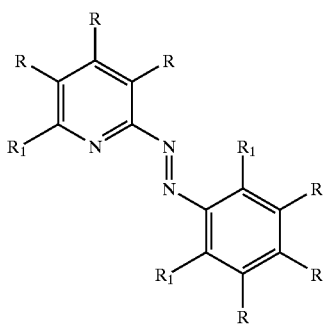

or can be of the structural formula:

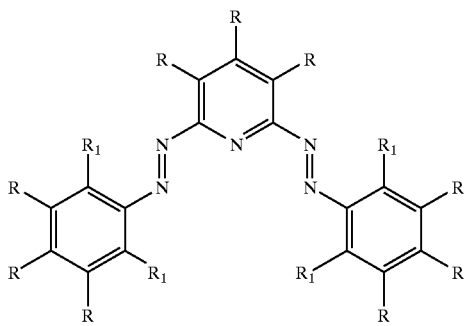

wherein R represents a hydrogen atom, a hydrocarbyl group, a substituted hydrocarbyl group, or a heteroatom containing hydrocarbyl group wherein the heteroatom is selected from the group consisting of boron, nitrogen, sulfur, phosphorus, oxygen, and silicon, and wherein $R_1$ represents hydrogen atoms or methyl groups. It is to be understood that each of the R groups in the ligand can be the same or different from other R groups in ligand and that each of the $R_1$ groups in the ligand can be the same or different from other $R_1$ groups in ligand. As used herein a "hydrocarbyl group" is a univalent group containing only carbon and hydrogen and a "substituted hydrocarbyl group" is a hydrocarbyl group that contains one or more substituent groups which are inert under the process conditions to which the compound containing these groups is subjected. In other words, the substituent groups do not substantially interfere with the polymerization reaction. In cases where R represents a hydrocarbyl group it will typically contain from 1 to about 30 carbon atoms and will more typically contain from 1 to about 20 carbon atoms. In cases where R represents a hydrocarbyl group it will preferably contain from 1 to about 6 carbon atoms and will more typically contain from 1 to about 4 carbon atoms. For instance, the hydrocarbyl group (R) can be a methyl group, an ethyl group, an iso-propel group, a normal-propel group, a normal-butyl group, an iso-butyl group, a tertiary-butyl group, a normal-pentyl group, a normal-hexyl group, or a phenyl group. It is generally preferred for R to represent a hydrogen atom or a methyl group (—$CH_3$).

The iminopyridines that can be used as the ligands in the catalyst systems of this invention can be of the structural formula:

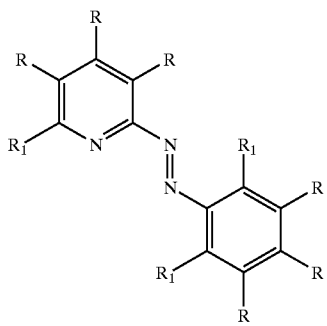

or can be of the structural formula:

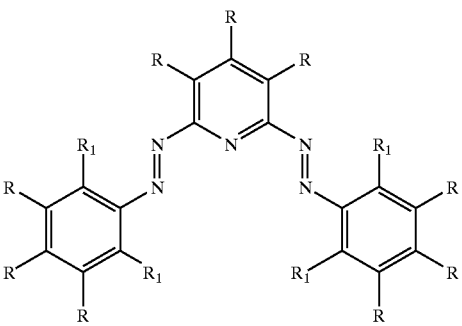

wherein R represents a hydrogen atom, a hydrocarbyl group, or a substituted hydrocarbyl group, and wherein $R_1$ represents hydrogen atoms or methyl groups. It is to be understood that each of the R groups in the ligand can be the same or different from other R groups in ligand and that each of the $R_1$ groups in the ligand can be the same or different from other $R_1$ groups in ligand. As used herein a "hydrocarbyl group" is a univalent group containing only carbon and hydrogen and a "substituted hydrocarbyl group" is a hydrocarbyl group that contains one or more substituent groups which are inert under the process conditions to which the compound containing these groups is subjected. In other words, the substituent groups do not substantially interfere with the polymerization reaction. In cases where R represents a hydrocarbyl group it will typically contain from 1 to about 30 carbon atoms and will more typically contain from 1 to about 20 carbon atoms. In cases where R represents a hydrocarbyl group it will preferably contain from 1 to about 6 carbon atoms and will more typically contain from 1 to about 4 carbon atoms. For instance, the hydrocarbyl group (R) can be a methyl group, an ethyl group, an iso-propel group, a normal-propel group, a normal-butyl group, an iso-butyl group, a tertiary-butyl group, a normal-pentyl group, a normal-hexyl group, or a phenyl group. It is generally preferred for R to represent a hydrogen atom or a methyl group (—$CH_3$). Some highly preferred azopyridine compounds that can be utilized as the ligand in the catalyst systems of this invention include 2-phenylazopyridine, 4-methyl-2-phenylazopyridine, and 2,6-diphenylazopyridine.

The methylalumoxane (MAO) used in the catalyst systems of this invention can be of the general structural formula $(CH_3)_2$—AlO—$[Al(CH_3)O]_n$—$Al(CH_3)_2$, wherein n represents an integer from 5 to 20. The methylalumoxane used will typically have a formula selected from the group consisting of

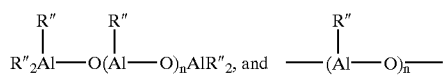

wherein R″ represents an alkyl group containing from 1 to about 10 carbon atoms, and wherein n represents an integer from 1 to about 40 and preferably 3 to about 20. In co-catalysts of the MAO type which are of the formula:

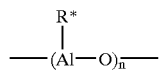

R* will preferably contain from 1 to about 4 carbon atoms with methyl groups being most preferred.

The molar ratio of the aluminum in the methylalumoxane to the iron or cobalt will typically be within the range of about 10:1 to about 10,000:1. The molar ratio of the aluminum in the methylalumoxane to the iron or cobalt will more typically be within the range of about 100:1 to about 5,000:1. The molar ratio of the aluminum in the methylalumoxane to the iron or cobalt will preferably be within the range of about 400:1 to about 2,000:1. In commercial applications, the molar ratio of the aluminum in the methylalumoxane to the iron or cobalt will normally be within the range of about 50:1 to about 500:1.

In using the catalyst systems of this invention to polymerize monomers into polymers, the molar ratio of the iron or cobalt in the catalyst to the monomer will typically be within the range of about 0.001 mmol per 100 grams of monomer to about 10 mmol per 100 grams of monomer. The molar ratio of iron or cobalt in the catalyst to the monomer will more typically be within the range of about 0.01 mmol per 100 grams of monomer to about 10 mmol per 100 grams of monomer. The molar ratio of iron or cobalt in the catalyst to the monomer will preferably be within the range of about 0.05 mmol per 100 grams of monomer to about 1 mmol per 100 grams of monomer. The molar ratio of iron or cobalt in the catalyst to the monomer will more preferably be within the range of about 0.1 mmol per 100 grams of monomer to about 0.5 mmol per 100 grams of monomer.

The catalyst systems of this invention can be used to polymerize virtually any type of diene monomer, such as conjugated diolefin monomers. The conjugated diolefin monomers that can be polymerized into polymers with the catalyst systems of this invention are of the general structural formula:

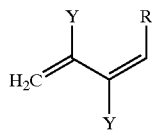

wherein R is selected from the group consisting of hydrogen atoms, alkyl groups (including cycloalkyl groups) alkaryl groups, or aryl groups containing from 1 to about 8 carbon atoms, and wherein Y and Y' can be the same of different and represent hydrogen atoms or alkyl groups containing from 1 to about 4 carbon atoms. Some representative examples of conjugated diolefin monomers that can be polymerized with the catalyst systems of this invention include 1,3-butadiene, isoprene, piperylene, 2-methyl-1,3-pentadiene, 2-ethyl-1,3-butadiene, 4-butyl-1,3-pentadiene, 2,3-dimethyl-1,3-pentadiene, 1,3-hexadiene, 1,3-octadiene, 1-phenyl-1,3-butadiene, and the like. The catalyst systems of this invention can also be used to copolymerize vinyl aromatic monomers with diene monomers. For instance, the catalyst systems of this invention can be used to copolymerize 1,3-butadiene and styrene to make styrene-butadiene rubber.

The polymerizations of this invention can be carried out over a broad temperature range of from about 0° C. to about 100° C. The polymerization will typically be carried out at a temperature which is within the range of about 30° C. to about 90° C. It is normally preferred to conduct the polymerization at a temperature which is within the range of about 50° C. to about 80° C.

The polymerizations of this invention will normally be carried out in a hydrocarbon solvent that can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture. The polymerizations of this invention can also be conducted as bulk phase or gas phase reactions with the catalyst system being either supported or unsupported.

In such solution polymerization, there will normally be from 10 to 40 weight percent monomers in the polymerization medium. Such polymerization media are, of course, comprised of the organic solvent and monomers. In most cases, it will be preferred for the polymerization medium to contain from 15 to 25 weight percent monomers. It is generally more preferred for the polymerization medium to contain 30 to 35 weight percent monomers.

The polymerization is conducted for a length of time sufficient to permit substantially complete polymerization of monomers. In other words, the polymerization is normally carried out until high conversions are attained. The polymerization can then be terminated using a standard technique. For instance, the polymerization can be terminated with a conventional noncoupling type of terminator, such as water, an acid, a lower alcohol, and the like.

After the copolymerization has been completed, the polymer can be recovered from the organic solvent. The polymer can be recovered from the organic solvent and residue by means such as decantation, filtration, centrification and the like. It is often desirable to precipitate the polymer from the organic solvent by the addition of lower alcohols containing from about 1 to about 4 carbon atoms to the polymer solution. Suitable lower alcohols for precipitation of the polymer from the polymer cement include methanol, ethanol, isopropyl alcohol, normal-propel alcohol and t-butyl alcohol. After the polymer is recovered from the solution, steam-stripping can be employed to reduce the level of volatile organic compounds in the polymer.

EXAMPLES

This invention is illustrated by the following examples which are merely for the purpose of illustration and are not to be regarded as limiting the scope of the invention or the manner in which it can be practiced. Unless specifically indicated otherwise, parts and percentages are given by weight.

General Procedures

All manipulations were performed under a nitrogen ($N_2$) atmosphere using standard Schlenk techniques or an inert atmosphere gloved dry box unless otherwise noted. The 10 weight percent 1,3-butadiene premix solution in hexane was dried by being passed through a column of silica before being used. Modified methylalumoxane (MMAO) was purchased from Akzo Nobel as a 6.42 wt % solution in heptane iron(II) acetate, iron(III) acetylacetonate, cobalt(III) acetylacetonate, iron(III) chloride, iron(I) chloride tetrahydrate, and iron(III) chloride hexahydrate were purchased from Aldrich and used as received. The 2-phenylazopyridine (2-PAP), the 2,6-diphenylazopyridine (2,6-DPAP), the 4-methyl-2-phenylazopyridine (4-Me-2-PAP), and the 2,6-bis-[1-(2,6-dimetylphenylimino)-ethyl]pyridine (DIP) were prepared according to the procedure described in J. Am. Chem. Soc., 1998, 120, 4049. The 2,6-bis-[1-(2,6-dimetylphenylimino)ethyl]pyridine iron(II) chloride ((DIP)Fe(II)C12) was prepared and characterized according to the procedure disclosed in J. Am. Chem. Soc., 1998, 120, 4049. Polymer microstructures were determined on a Nicolet 510 SX FTIR Polymer molecular weights were determined by SEC using a Wyatt Minidawn light scattering detector unit.

Catalyst Synthesis

Each catalyst was synthesized "in situ" by weighing 0.12 mmoles of the desired ligand and metal containing starting material, and 30 mL of dichloromethane ($CH_2Cl_2$) directly into oven dried 4 ounce (118 ml) bottles in an inert atmosphere dry box (4.0E-3 M; Table 1). The bottles where sealed with rubber and Teflon lined metal caps (through which holes had been punched), removed from the dry box, and shaken at a temperature of about 25° C. for 3 hours. The following observations were made with respect to the catalysts, before and after being shaken (see Table 2).

Polymerization Procedure

A series of oven dried 4 ounce (118 ml) bottles, which had been cooled under nitrogen, where loaded with 10 weight percent 1,3-butadiene premix solutions in hexane (80 mL). These bottles were sealed with rubber and Teflon lined metal caps (through which holes had been punched). The bottles were taken into a dry box and MMAO (17.4 mL; Al:M= 1500) was added. The polymerizations were initiated by injecting the catalyst solution (5 mL) just after being shaken. After being initiated the bottles were agitated for 2 h in a constant temperature bath set at ca. 35° C. The polymerizations were terminated by injecting a total of 10 mL of a 10 weight percent isopropyl alcohol 10 solution in toluene, 1 mL at a time followed by exhaustive venting. Finally, Versene (2 mL; 3 mole equiv./mole metal) and BHT (1 mL; saturated isopropanol solution) were added and polymers were dried to constant weight in a vacuum oven. The results shown in Table 3 were obtained. Note that the aluminum inorganic material produced upon short stopping, artificially increasing the yields.

Control Experiments

A series of control polymerizations were conducted in a similar manner to the experimental polymerizations outlined above, except that the control catalyst solution concentrations were doubled and were not used until 48 hours after being shaken for 3 hours at a temperature of 25° C. Furthermore, the control polymerizations were conducted on half the scale of the experimental polymerizations and therefore, half as much Versene and BHT was added. The control catalyst solutions were synthesized by weighing 0.12 mmoles of the desired metal containing starting material and $CH_2Cl_2$ (15 mL) directly into oven dried 4 ounce (118 ml) bottles in an inert atmosphere dry box (8.0E-3 M; Table 4). Note that in Bottle 19, isolated, preformed catalyst was used.

The bottles where sealed with rubber and Teflon lined metal caps (through which holes had been punched), removed from the dry box, and shaken at a temperature of about 25° C. for 3 hours. The observations shown in Table 5 were made with respect to the catalysts, before and after being shaken, and before being used. The results shown in Table 6 were obtained. Note that the aluminum inorganic material produced upon short stopping was not removed, artificially increasing the yields.

TABLE 1

| Bottle # | Metal (mg) | Ligand (mg) | CH2Cl2 (mL) |
|---|---|---|---|
| 1 | Fe(II)(acetate)2 20.87 | 2-PAP 21.98 | 30 |
| 2 | Fe(III)(acac)3 42.38 | 2-PAP 21.98 | 30 |
| 3 | Co(III)(acac)3 42.74 | 2-PAP 21.98 | 30 |
| 4 | FeCl3 19.47 | 2-PAP 21.98 | 30 |
| 5 | FeCl2(H2O)4 23.86 | 2-PAP 21.98 | 30 |
| 6 | FeCl3(H2O)6 32.44 | 2-PAP 21.98 | 30 |
| 7 | Fe(II)(acetate)2 20.87 | 2,6-DPAP 34.48 | 30 |
| 8 | Fe(III)(acac)3 42.38 | 2,6-DPAP 34.48 | 30 |
| 9 | Co(III)(acac)3 42.74 | 2,6-DPAP 34.48 | 30 |
| 10 | FeCl3 19.47 | 2,6-DPAP 34.48 | 30 |
| 11 | FeCl2(H2O)4 23.86 | 2,6-DPAP 34.48 | 30 |
| 12 | FeCl3(H2O)6 32.44 | 2,6-DPAP 34.48 | 30 |
| 13 | Fe(II)(acetate)2 20.87 | 4-Me-2-PAP 23.67 | 30 |
| 14 | Fe(III)(acac)3 42.38 | 4-Me-2-PAP 23.67 | 30 |
| 15 | Co(III)(acac)3 42.74 | 4-Me-2-PAP 23.67 | 30 |
| 16 | FeCl3 19.47 | 4-Me-2-PAP 23.67 | 30 |
| 17 | FeCl2(H2O)4 23.86 | 4-Me-2-PAP 23.67 | 30 |
| 18 | FeCl3(H2O)6 32.44 | 4-Me-2-PAP 23.67 | 30 |

TABLE 2

| Bottle # | State After Mixing | Color After Mixing | State After Stirring 3h | Color After Stirring 3h |
|---|---|---|---|---|
| 1 | Homo | yellow/orange | Homo | yellow |
| 2 | Homo | red/orange | Homo | red |
| 3 | Homo | emerald green | Homo | yellow |
| 4 | Hetero | brown | Homo | red |
| 5 | Hetero | brown | Homo | red |
| 6 | Hetero | emerald green | Homo | red |
| 7 | Homo | red/orange | Homo | green |
| 8 | Homo | red/orange | Homo | deep red |
| 9 | Homo | deep red | Homo | green |
| 10 | Homo | dark brown | Homo | dark green |
| 11 | Homo | dark brown | Homo | deep red |
| 12 | Hetero | dark brown | Homo | dark green |
| 13 | Homo | yellow/orange | Hetero/Homo | blue |
| 14 | Homo | red/orange | Hetero/Homo | red/brown |
| 15 | Homo | emerald green | Hetero/Homo | blue |
| 16 | Homo | green/brown | Hetero | green |
| 17 | Hetero | green/brown | Hetero | red/brown |
| 18 | Hetero | light green | Hetero | green |

TABLE 2-continued

| Bottle # | State After Mixing | Color After Mixing | State After Stirring 3h | Color After Stirring 3h |
|---|---|---|---|---|
| 2-PAP | Homo | yellow/orange | Homo | yellow/orange |
| 2,6-DPAP | Homo | red/orange | Homo | red/orange |
| 4-Me-2-PAP | Homo | yellow/orange | Homo | yellow/orange |

TABLE 3

| Bottle # | Yield (%) | cis (%) | trans (%) | vinyl (%) | Mw/Mn | Mn | Mw | Mz |
|---|---|---|---|---|---|---|---|---|
| 1 | 27.7 | 74.64 | 17.04 | 8.33 | 2.05 | 75,260 | 154,300 | 275,400 |
| 2 | 50.1 | 74 | 17.62 | 8.38 | 2.131 | 72,720 | 154,900 | 296,900 |
| 3 | 65.8 | 74.27 | 17.4 | 8.32 | 2.339 | 64,680 | 151,300 | 298,900 |
| 4 | 72.5 | 70.07 | 20.13 | 9.79 | 3.037 | 44,850 | 136,200 | 357,800 |
| 5 | 66.5 | 71.36 | 20.2 | 8.43 | 2.727 | 49,350 | 134,600 | 285,000 |
| 6 | 78.1 | 71.56 | 19.39 | 9.06 | 3.637 | 41,810 | 152,100 | 401,500 |
| 7 | 58.8 | 96.72 | 0.75 | 2.53 | 2.135 | 61,410 | 131,100 | 195,500 |
| 8 | 78.7 | 96.96 | 0.5 | 2.53 | 1.955 | 105,700 | 206,700 | 321,100 |
| 9 | 56.1 | 96.58 | 0.85 | 2.56 | 1.934 | 51,220 | 99,060 | 150,900 |
| 10 | 124.5 | 61.52 | 17.72 | 20.75 | 16.591 | 14,700 | 24,390 | 120,000 |
| 11 | 16.6 | 73.08 | 18.56 | 8.37 | 2.528 | 53,920 | 136,300 | 275,100 |
| 12 | 118.2 | 61.33 | 21.82 | 16.85 | 6.476 | 14,720 | 95,330 | 553,000 |
| 13 | 77.3 | 72.02 | 16.66 | 11.32 | 4.926 | 37,460 | 184,500 | 818,800 |
| 14 | 29.3 | 73.97 | 17.6 | 8.42 | 2.127 | 68,690 | 146,100 | 266,600 |
| 15 | 80.9 | 71.56 | 16.59 | 11.85 | 8.781 | 24,610 | 21,610 | 116,400 |
| 16 | 69.4 | 68.64 | 13.26 | 18.1 | 11.441 | 31,360 | 358,800 | 1,841,000 |
| 17 | 60.2 | 73.7 | 17.91 | 8.38 | 2.415 | 68,150 | 164,600 | 345,800 |
| 18 | 60.8 | 66.29 | 11.93 | 21.78 | 16.521 | 39,870 | 658,700 | 3,105,000 |

TABLE 4

| Bottle # | Metal (mg) | Ligand (mg) | CH2Cl2 (mL) |
|---|---|---|---|
| 19 | (DIP)Fe(II)Cl2 50.89 | | 15 |
| 20 | FeCl2(H2O)4 23.86 | DIP 35.68 | 15 |
| 21 | FeCl3 19.47 | | 15 |
| 22 | FeCl3 19.47 | 2,6-DPAP 34.48 | 15 |
| 23 | FeCl3(H2O)6 32.44 | 2,6-DPAP 34.48 | 15 |
| 24 | Fe(II)(acetate)2 20.87 | | 15 |
| 25 | Fe(III)(acac)3 42.38 | | 15 |
| 26 | Co(III)(acac)3 42.74 | | 15 |
| 27 | FeCl2(H2O)4 23.86 | | 15 |
| 28 | FeCl3(H2O)6 32.44 | | 15 |
| 4 | Table 1 | | |
| 16 | Table 1 | | |

TABLE 5

| Bottle # | State After Mixing | Color After Mixing | State After Stirring 3 h | Color After Stirring 3 h | State before use | Color before use |
|---|---|---|---|---|---|---|
| 19 | Homo | deep blue | Homo | blue/green | Homo | deep blue |
| 20 | Hetero | light yellow | Homo | blue/green | Homo | blue/black |
| 21 | Hetero | yellow | Homo | yellow | Hetero | orange |
| 22 | Hetero | brown/black | Homo | red/brown | Homo | red/black |
| 23 | Hetero | brown/black | Homo | red/brown | Homo | red/black |

TABLE 5-continued

| Bottle # | State After Mixing | Color After Mixing | State After Stirring 3 h | Color After Stirring 3 h | State before use | Color before use |
|---|---|---|---|---|---|---|
| 24 | Hetero | clear | Hetero | clear | Hetero | clear |
| 25 | Homo | red/orange | Homo | red/orange | Homo | red/orange |
| 26 | Hetero | bright green | Homo | green | Homo | green |
| 27 | Hetero | clear | Hetero | clear | Hetero | clear |
| 28 | Hetero | clear | Hetero | pale yellow | Hetero | pale orange |
| 4 | | | Homo | dark green | | |
| 16 | | | Homo | dark green | | |

TABLE 6

| Bottle # | Yield (%) | cis (%) | trans (%) | vinyl (%) | Mw/Mn | Mn | Mw | Mw |
|---|---|---|---|---|---|---|---|---|
| 19 | 39.6 | 74.66 | 16.07 | 9.26 | 1.72 | 60,460 | 104,000 | 170,400 |
| 20 | 55.3 | 74.14 | 17.06 | 8.8 | 1.709 | 65,290 | 111,600 | 173,900 |
| 21 | 62.2 | 73.42 | 18.53 | 8.05 | 2.273 | 67,550 | 153,600 | 288,900 |
| 22 | 74.5 | 73.72 | 18.18 | 8.1 | 2.024 | 62,830 | 127,200 | 229,000 |
| 23 | 75.0 | 73.67 | 18.22 | 8.12 | 2.274 | 61,200 | 139,200 | 259,800 |
| 24 | 61.2 | 74.49 | 17.53 | 7.98 | 2.244 | 63,200 | 142,700 | 256,000 |
| 25 | 36.7 | 72.47 | 19.16 | 8.38 | 2.291 | 59,520 | 136,400 | 254,400 |
| 26 | 47.9 | 96.61 | 0.84 | 2.55 | 1.604 | 56,100 | 90,020 | 126,800 |
| 27 | 0.0 | — | — | — | — | — | — | — |
| 28 | 55.1 | 74.49 | 17.53 | 7.98 | 1.858 | 97,210 | 180,700 | 306,500 |
| 4 | 49.2 | 55.64 | 5.01 | 39.35 | 4.59 | 257,300 | 1,181,000 | 2,104,000 |
| 16 | 58.8 | 55.65 | 5.8 | 38.56 | 5.277 | 203,600 | 1,074,000 | 1,921,000 |

Peparation of 4-Methyl-2-pyridylazo-anil)$_2$FeCl$_2$

A 25 mL round bottom flask was charged with 4-methyl-2-diazophenyl-pyridine (100 mg, 0.5 mmol), FeCl$_2$ (63 mg, 0,5 mmol) and THF (5 mL). The suspension was stirred at ambient temperature for 3 days. The dark green precipitate was isolated via vacuum filtration. The solid was washed with THF (3×1 mL) and dried under vacuum. The yield attained was 81%.

Polymerization of 1.3-Butadiene with 4-Methyl-2-pyridylazo-anil)$_2$FeCl$_2$ Activated with MMAO An oven dried 4 ounce (118 mL) glass bottle, which had been cooled under nitrogen, was loaded with 4.6 weight percent 1,3-butadiene solutions in hexane (100 mL). The bottle was sealed with a rubber and Teflon lined metal cap (through which holes had been punched). MMAO solution (1 mL, 2.2 M/heptane) and (4-methyl-2-diazophenyl-pyridine)$_2$FeCl$_2$(1 mL, 0.01M suspension in CH$_2$Cl$_2$), were added sequentially. The bottle was placed onto a shaker for 1 hour at ambient temperature. The polymerization was terminated by adding short-stop solution (1 mL) consisting of a 10% BHT methanol solution. The polymer was isolated by evaporating of all volatile compounds. The yield attained was 2.6 g which represents a conversion of 82%. The polymer had a weight average molecular weight (Mw) of 2.1×10$^6$ and a cis/trans/vinyl microstructure of 54%/6%/40%.

Peparation of 4-(2-Pyridylazo)-N,N-dimethylanil)$_2$FeCl$_2$

A 25 mL round bottom flask was charged with 4-(2-pyridylazo)-N,N-dimethylaniline (226 mg, 1.0 mmol), FeCl$_2$ (126 mg, 1,0 mmol) and THF (10 mL). The suspension was stirred at ambient temperature for 3 days. The dark green precipitate was isolated via vacuum filtration. The solid was washed with THF (3×1 mL) and dried under vacuum. The yield attained was 65%.

Polymerization of 1.3-Butadiene with 4-(2-Pyridylazo)-N,N-dimethylanil)$_2$FeCl$_2$ Activated with MMAO An oven dried 4 ounce (118 mL) glass bottle, which had been cooled under nitrogen, was loaded with 4.6 weight percent 1,3-butadiene solutions in hexane (100 mL). The bottle was sealed with a rubber and Teflon lined metal cap (through which holes had been punched). MMAO solution (1 mL, 2,2 M/heptane) and (4-methyl-2-diazophenyl-pyridine)$_2$FeCl$_2$(2 mL, 0.005 M dispersion in light mineral oil), were added sequentially. The bottle was placed onto a shaker for 1 hour at ambient temperature. The polymerization was terminated by adding short-stop solution (1 mL) consisting of a 10% BHT methanol solution. The polymer was isolated by evaporation of all volatile compounds. The yield attained was 2.4 g which represents a conversion of 77%. The polymer had a weight average molecular weight (Mw) of 2.0×10$^6$ and had a cis/trans/vinyl microstructure of 50%/10%/40%.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing a rubbery polymer which comprises polymerizing at least one diene monomer in the presence of a catalyst system which is comprised of (A) a transition metal compound selected from the group consisting of iron (II) compounds, iron (III) compounds, cobalt (II) compounds, cobalt (III) compounds, and nickel (II) compounds, (B) a ligand selected from the group consisting of (i) azopyridines of the structural formula:

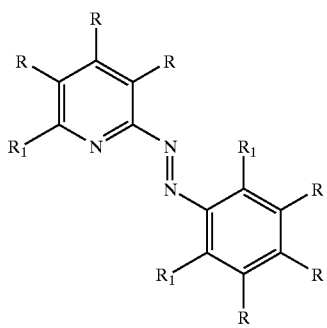

(ii) azopyridines of the structural formula:

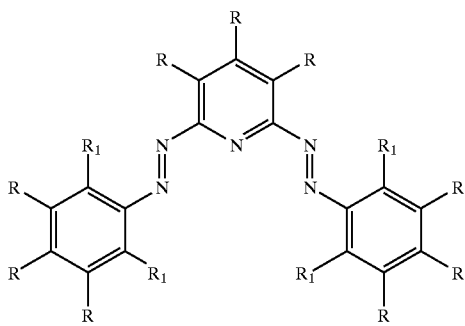

(iii) iminopyridines of the structural formula:

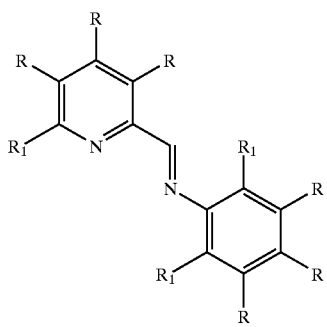

and (iv) iminopyridines of the structural formula:

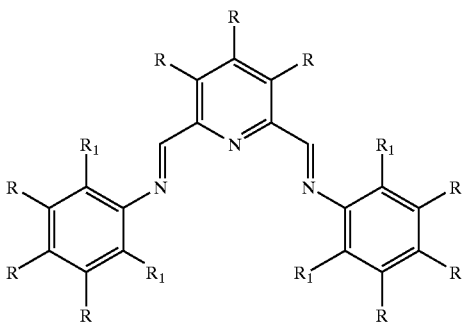

wherein R represents a hydrogen atom, a hydrocarbyl group, a substituted hydrocarbyl group, or a heteroatom containing hydrocarbyl group wherein the heteroatom is selected from the group consisting of boron, nitrogen, sulfur, phosphorus, oxygen, and silicon, and wherein $R_1$ represents a hydrogen atoms or a methyl groups; and (C) methylalumoxane.

2. A process for synthesizing a rubbery polymer as specified in claim 1 wherein the rubbery polymer is polybutadiene rubber, wherein the diene monomer is 1,3-butadiene, and wherein said process is conducted at a temperature which is within the range of about 10° C. to about 100° C.

3. A process as specified in claim 1 wherein said polymerization is conducted in a hydrocarbon solvent.

4. A process as specified in claim 3 wherein the transition metal in said catalyst system is present at a level which is within the range of about 0.001 mmol per 100 grams of monomer to about 10 mmol per 100 grams of monomer, and wherein the molar ratio of the aluminum in the methylalumoxane to the nickel, iron or cobalt in the transition metal compound is within the range of about 10:1 to about 10,000:1.

5. A process as specified in claim 4 wherein the ligand is selected from the group consisting of azopyridine and iminopyridine.

6. A process as specified in claim 5 wherein R represents hydrogen atoms or methyl groups.

7. A process as specified in claim 6 wherein the ligand is selected from the group consisting of 2-phenylazopyridine, 4-methyl-2-phenylazopyridine, and 2,6-diphenylazopyridine.

8. A process as specified in claim 7 wherein the transition metal compound is selected from the group consisting of iron(II) acetate, iron(III) acetylacetonate, cobalt(III) acetylacetonate, iron(III) chloride, iron(II) chloride tetrahydrate, and iron(III) chloride hexahydrate.

9. A process as specified in claim 1 wherein the polymerization is conducted at a temperature which is within the range of about 30° C. to about 90° C., wherein the transition metal in said catalyst system is present at a level which is within the range of about 0.05 mmol per 100 grams of monomer to about 1 mmol per 100 grams of monomer; and wherein the molar ratio of the aluminum in the methylalumoxane to the nickel, iron or cobalt in the transition metal compound is within the range of about 100:1 to about 5,000:1.

10. A process as specified in claim 9 wherein the transition metal in said catalyst system is present at a level which is within the range of about 0.1 mmol per 100 grams of monomer to about 0.5 mmol per 100 grams of monomer and wherein the molar ratio of the aluminum in the methylalumoxane to the nickel, iron or cobalt in the transition metal compound is within the range of about 400:1 to about 2,000:1.

11. A process as specified in claim 10 wherein the molar ratio of the aluminum in the methylalumoxane to the nickel, iron or cobalt in the transition metal compound is within the range of about 50:1 to about 500:1.

12. A process as specified in claim 1 wherein the heteroatom in the heteroatom containing hydrocarbyl groups is nitrogen.

13. A process as specified in claim 1 wherein the diene monomer is selected from the group consisting of 1,3-butadiene, isoprene, piperylene, 2-methyl-1,3-pentadiene, 2-ethyl-1,3-butadiene, 4-butyl-1,3-pentadiene, 2,3-dimethyl-1,3-pentadiene, 1,3-hexadiene, 1,3-octadiene, and 1-phenyl-1,3-butadiene.

14. A process as specified in claim 1 wherein the diene monomer is a conjugated diolefin monomer.

15. A process as specified in claim 1 wherein the diene monomer is isoprene.

16. A process as specified in claim 1 wherein the diene monomer is piperylene.

17. A process as specified in claim 1 wherein the ligand is an azopyridine.

18. A process as specified in claim 1 wherein the ligand is an iminopyridine.

* * * * *